(No Model.)
C. FURBISH.
MANUFACTURE OF SCREW BOLTS.
No. 357,768. Patented Feb. 15, 1887.
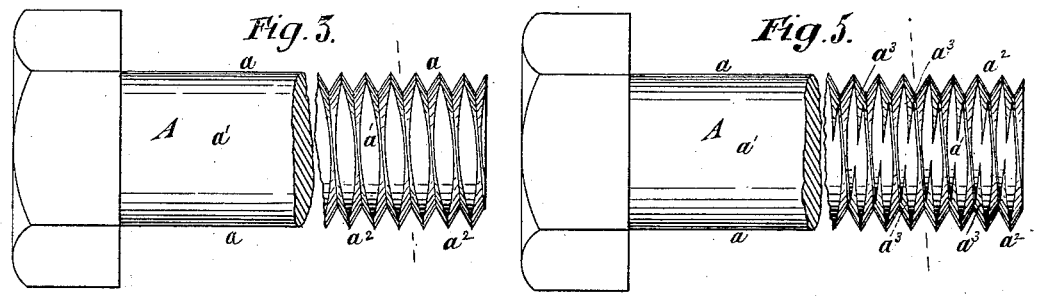
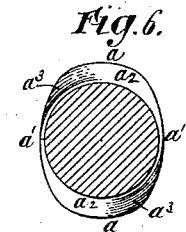
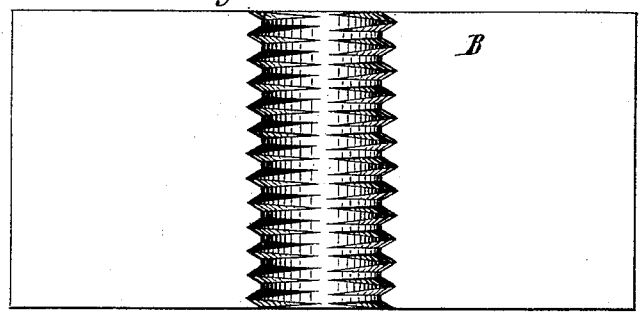
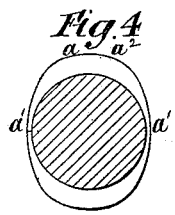
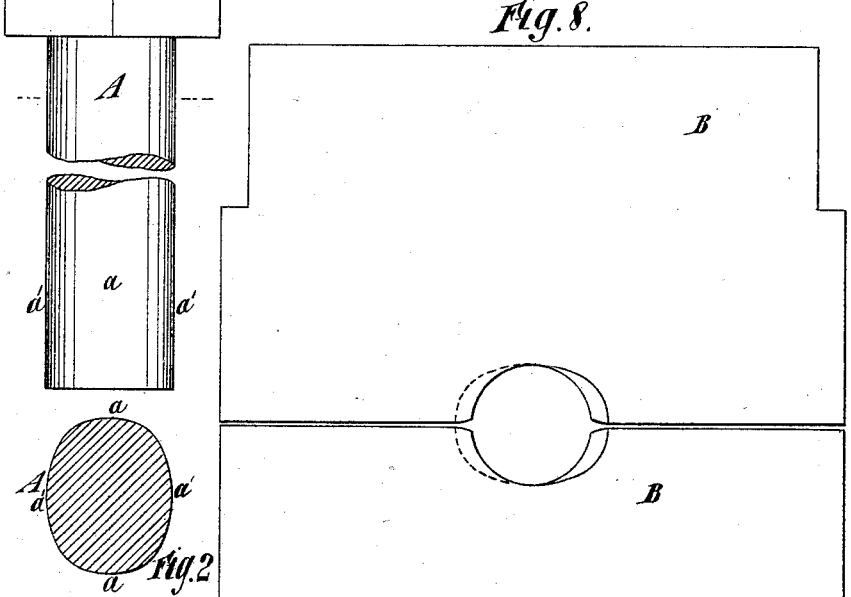
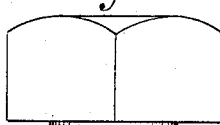
Witnesses
N Bowen
dy
Inventor
C. Furbish
by his attys,
Gifford & Brown
N. PETERS. Photo-Lithographer, Washington, D. C.

UNITED STATES PATENT OFFICE.

CLINTON FURBISH, OF BROOKLYN, ASSIGNOR TO THE TUBAL CAIN TAP, DIE, AND BOLT COMPANY, OF NEW YORK, N. Y.

MANUFACTURE OF SCREW-BOLTS.

SPECIFICATION forming part of Letters Patent No. 357,768, dated February 15, 1887.

Application filed October 23, 1885. Renewed July 30, 1886. Serial No. 209,567. (No model.)

*To all whom it may concern:*

Be it known that I, CLINTON FURBISH, of Brooklyn, in Kings county, and in the State of New York, have invented a certain new and useful Improvement in the Manufacture of Screws, Bolts, &c., of which the following is a specification.

This improvement relates to the manufacture of a screw or bolt which has a thread or series of thread-segments adapted to engage with a nut having either a right or a left hand thread or with two nuts having reverse threads.

The improvement consists in forming a blank for a screw or bolt with arc-shaped portions and intermediate flattened, grooved, or hollowed out portions, in cutting either a right-hand or a left-hand screw-thread upon this blank or its arc-shaped portions, and in subsequently subjecting the screw or bolt to the action of dies, whereby the screw-thread will be so chamfered off that it will be adapted to engage with a nut having a right or a left hand screw-thread or with two nuts having reverse threads.

In the accompanying drawings, Figure 1 is a side view of a bolt-blank made according to my improvement. Fig. 2 is an end view thereof. Fig. 3 is a side view of the bolt having the thread upon it. Fig. 4 is a transverse section of the bolt in the same condition. Fig. 5 is a side view of the finished bolt. Fig. 6 is a transverse section of the same. Fig. 7 is a view of one of the dies used in the manufacture of the bolt. Fig. 8 is an end view of a pair of the dies.

Similar letters of reference designate corresponding parts in all the figures.

A designates a bolt-blank, which has two opposite arc-shaped portions, $a$, and two intermediate flattened portions, $a'$. It has a thread, $a^2$, cut upon it. This thread is of greatest projection at the arc-shaped portions $a$ of the bolt-blank, and has only a slight projection at the intermediate portions. Indeed it need not extend over the flattened portions. The portions of greatest projection are the operative portions. They are so short circumferentially of the bolt that either a right or a left hand screw-threaded nut can be used in the bolt.

To facilitate the use upon the bolt of a nut having a thread the reverse of that which is cut upon the bolt portions of the screw-thread on the bolt at the ends are chamfered off to there enlarge the space between adjacent convolutions of the thread. The chamfers spoken of are lettered $a^3$.

The chamfers $a^3$ are produced by subjecting the bolt to the action of dies B, whereby they are pressed in the thread. The dies may be operated in any suitable press.

By my improvement I am enabled to produce the described bolt both economically and in such manner that the thread will possess great strength.

The arc-shaped portions of the bolt may be of the shape of arcs of the same circle or of an ellipse.

What I claim as my invention, and desire to secure by Letters Patent, is—

The method of producing a screw or bolt which is adapted to receive a nut having either a right or a left hand screw-thread, consisting in forming a blank having two opposite arc-shaped portions and intermediate flattened portions, in cutting a thread upon such blank, and in subsequently chamfering portions of the thread by means of dies, substantially as specified.

CLINTON FURBISH.

Witnesses:
DANIEL H. DRISCOLL,
JAS. R. BOWEN.